United States Patent [19]
Murphy, Jr. et al.

[11] Patent Number: 5,355,733
[45] Date of Patent: Oct. 18, 1994

[54] WIDE SCALE POINTER ARC, DIAPHRAGM GAUGE

[75] Inventors: Frank W. Murphy, Jr., Box 470248, Tulsa, Okla. 74147; Lewis M. Carlton, Tulsa, Okla.

[73] Assignees: Frank W. Murphy, Jr.; Murphy Management Inc., both of Tulsa, Okla.

[21] Appl. No.: 820,467

[22] Filed: Jan. 14, 1992

[51] Int. Cl.5 .............................. G01L 7/08
[52] U.S. Cl. ...................... 73/715; 73/756; 116/34 R
[58] Field of Search .......... 73/715, 716, 756, 146.8, 73/386, 387; 116/34 R

[56] References Cited

U.S. PATENT DOCUMENTS

| | | | |
|---|---|---|---|
| 18,526 | 10/1857 | Allen | 73/715 |
| 30,803 | 12/1860 | Daboll | 73/715 |
| 1,411,917 | 4/1922 | Harris | 73/715 |
| 1,666,787 | 4/1928 | Michelin | 73/715 |
| 2,123,532 | 7/1938 | Hastings et al. | 73/715 |
| 3,111,033 | 11/1963 | Muzzi | 73/362 |
| 3,375,718 | 4/1968 | Robinson et al. | 73/715 |
| 3,916,185 | 10/1975 | Jehly | 73/386 |
| 4,240,297 | 12/1980 | Speidel | 73/715 |
| 4,552,153 | 11/1985 | Newman et al. | 128/677 |
| 4,733,564 | 3/1988 | Gorgé | 73/715 |

*Primary Examiner*—Donald Woodiel
*Attorney, Agent, or Firm*—Mark Ungerman

[57] ABSTRACT

An indicator gauge may utilize a motion amplifying gauge movement. The motion amplifying mechanism makes it possible for a diaphragm-type pressure gauge to provide large angular displacements for an indicating pointer. The indicator gauge may be configured to have a maximum readout visibility in the range from about 0° to about 270°. A single-piece crankshaft located on an adjustable mounting translates the short range of motion of a diaphragm button to a pivotal gear segment. The crankshaft may be configured as a C-shaped crankshaft or an L-shaped crankshaft. The pivotal gear segment may be wedge-shaped or have an extension arm for contact with the crankshaft. The crankshaft may also contact a downwardly or upwardly extending boss located on the pivotal gear segment.

26 Claims, 7 Drawing Sheets

WIDE SCALE POINTER ARC, DIAPHRAGM GAUGE

BACKGROUND OF INVENTION

1. Field of the Invention

The invention relates to an indicator device, and more particularly to a diaphragm-type pressure gauge having a movement amplifying mechanism.

2. Description of the Related Technology

Indicator gauges are instruments or meters which are utilized to monitor various parameters such as temperature, pressure, liquid levels or various electric properties. These instruments are specifically configured to give an indication of the monitored condition.

In prior gauges, the sensed condition is typically detected by a bourdon tube or a diaphragm. Both the bourdon tube and diaphragm-type instruments do have inherent drawbacks.

The bourdon tube instrument commonly utilizes a gear and pinion type movement. In the event of severe overpressure conditions—which happen quite frequently—the bourdon tube itself, at about one and a half times maximum operating range, will distort and either run the gear movement off track—thereby rendering itself useless—or reach a critical point within its elastic range and refuse to return to zero. In either case, the instrument is all but destroyed.

On the other hand, the diaphragm-type indicator gauge, especially those constructed according to U.S. Pat. No. 3,375,718, the disclosure of which is expressly incorporated herein, is protected up to two or three times overpressure due to the bottoming out of the diaphragm, but does not lend itself to maximum readout visibility because of the approximate 60° scale pointer arc. In contrast, a bourdon tube gauge typically has a maximum readout visibility of approximately 270° scale pointer arc.

SUMMARY OF THE INVENTION

It is an object of the invention to have an instrument which is of the diaphragm sensing type, but incorporates the gear movement type for a 270° arc-instrument readout.

It is a further object of the invention to enhance the operational characteristics of indicator gauges to overcome the operational limitations inherent in the utilization of both bourdon tubes and diaphragm-type pressure gauges. According to the invention, the overpressure advantages of a diaphragm movement and inexpensive crankshaft may be configured to provide the greater readout visibility associated with bourdon tube gauges.

It is also an object of the invention to provide a diaphragm-type pressure gauge having a display indicator needle arc range of 270° or greater. In particular, the invention discloses a geared pinion arrangement for amplifying the arcuate movement of the needle pointer. More specifically, the displacement of the pressure-sensitive diaphragm within the gauge causes movement of a crankshaft lever arm that impinges on one end of a pivotable sector gear. The sector gear drives a pinion connected to the needle pointer which thereby results in an enhanced range of arcuate needle movement.

The indicator gauge is made up of a gauge movement which is arranged and connected to respond to a particular sensed condition. The sensed condition may be a pressure, temperature, or electrical characteristic. The movement may be connected to a reading pointer which typically passes over a gauge face plate or some other type of local indicator to provide a visual reading of the sensed condition.

According to a preferred embodiment, a rotational bias mechanism or spiral spring is connected to a pivotal indicating pointer shaft.

According to the invention, the indicator gauge may be calibrated or adjusted by locating a base plate on an adjustable mounting. The adjustable mounting carries a crank arm. Additional features will become apparent from the description of the preferred embodiment.

DETAILED DESCRIPTION OF THE PREFERRED EMBODIMENT

Figure 1:
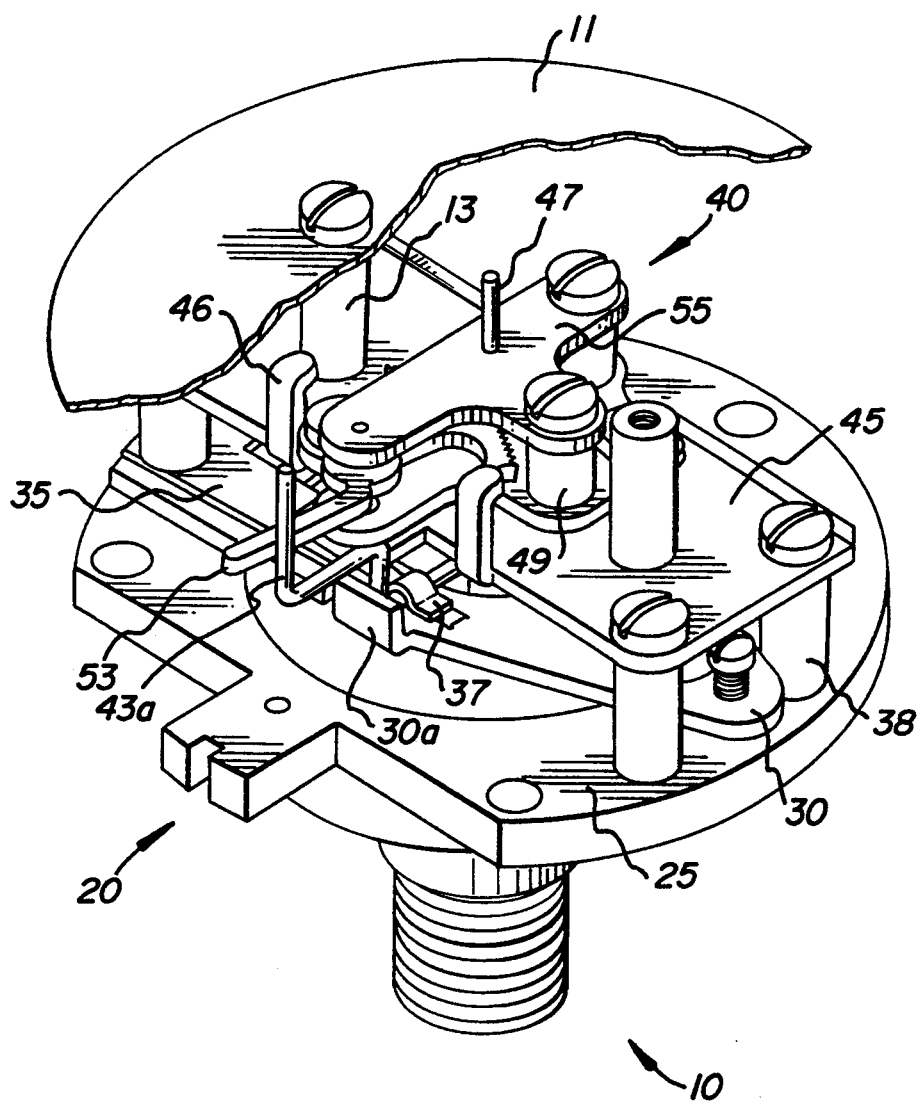
FIG. 1 shows a perspective view of an indicator gauge according to the invention.
Figure 2:
FIG. 2 shows a side view in elevation of an indicating pointer and indicating pointer shaft according to the invention.

FIGS. 1-6 schematically illustrate a first embodiment of an indicator gauge with a motion amplifying mechanism. The indicator gauge includes a condition responsive unit 10, which is typically enclosed by a housing or casing (not shown). The condition responsive unit is completely enclosed by the housing and a transparent cover (not shown) that closes an open end of the housing. Condition responsive unit 10 includes a condition sensing assembly 20, a base plate 30, a motion amplifying gauge movement 40 and an indicating pointer 12 (See FIG. 2).

FIG. 1 shows condition responsive unit 10, which may be configured to sense pressure, temperature or fluid level. The condition responsive unit translates the magnitude of the sensed condition into rotational motion of indicating pointer shaft 47 connected to indicating pointer 12. As indicating pointer 12 is rotatably located above an indicating dial 11, the magnitude of the sensed condition may be readily determined. Indicating dial 11 is secured to indicating dial stanchions 13 in any conventional manner, preferably by threaded fasteners.

Figure 3:
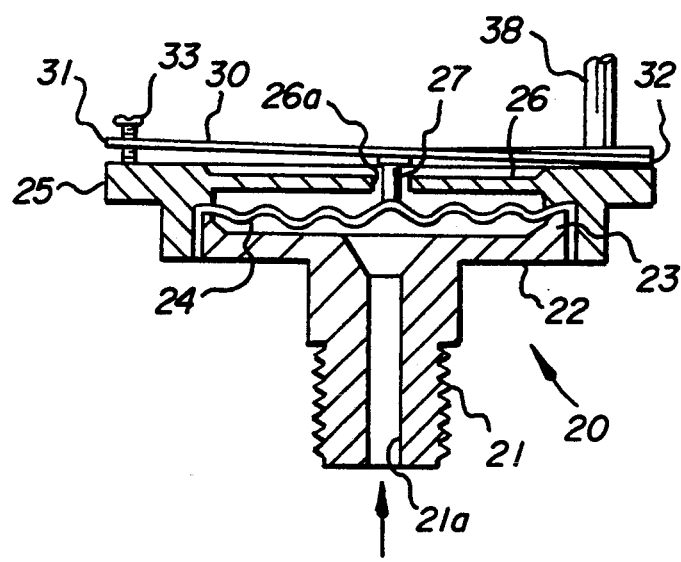
FIG. 3 shows a side view in elevation of a condition sensing assembly.

For illustrative purposes only, a pressure responsive unit is shown. As shown in FIG. 3, a condition sensing assembly 20 is secured within the housing and includes a threaded connector 21 with an orifice 21a extending therethrough. The connector terminates in a radially enlarged annular wall 22 with an upstanding shoulder 23 on the outer periphery thereof. A diaphragm 24 is clamped at its outer periphery between the shoulder 23 and the bottom of a fixed plate 25 secured on top of the connector.

The diaphragm moves or flexes in response to pressure sensed through orifice 21a. A diaphragm button 27 may be located in and may slide through an opening 26a in fixed plate 25. The diaphragm button has a first end that contacts the diaphragm. A base plate 30 may be secured over fixed plate 25 in spanning relationship to a recessed area 26 of fixed plate 25 through which diaphragm button 27 reciprocates in response to varying pressure conditions.

Figure 4:
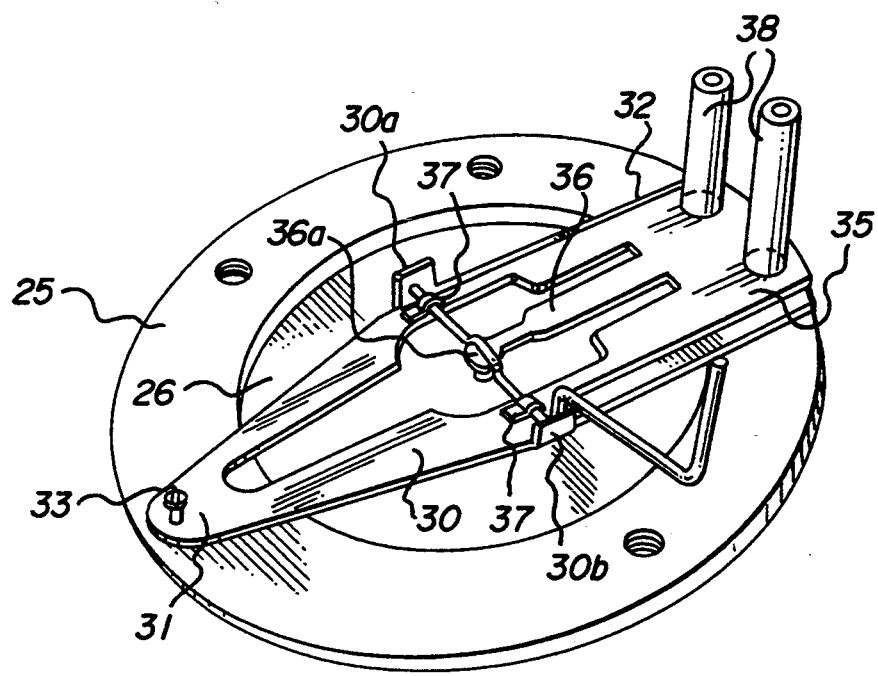
FIG. 4 shows a perspective view of the invention with an indicating dial and support platform removed for clarity.
Figure 5:
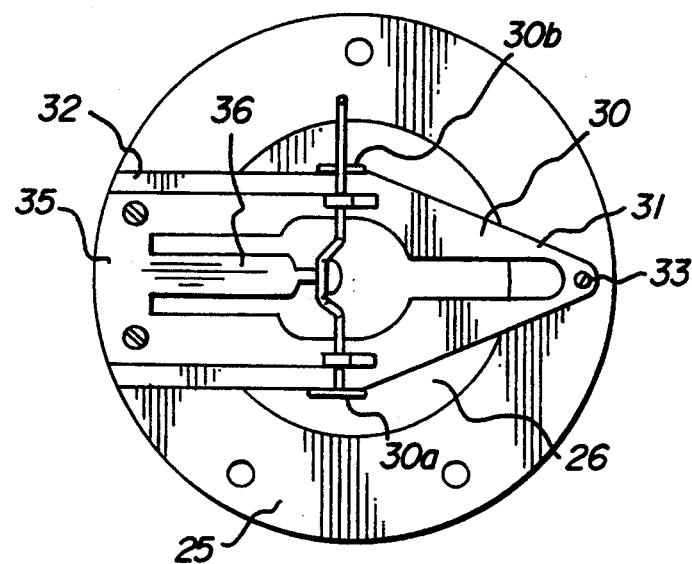
FIG. 5 shows a top plan view of the invention as shown in FIG. 4.

FIG. 4 shows base plate 30 including a reduced width end 31 and a base end 32. Preferably, base end 32 is fixedly secured to the top of fixed plate 25. An adjusting screw 33 may be provided so reduced width end 31 is adjustable toward and away from fixed plate 25. Pivot plate 35, which is located on, and preferably fixed to, base plate 30, includes pivot arm 36 and pivot supports 37. Free end 36a of pivot arm 36 is disposed in overlying relationship to diaphragm button 27. As the pressure in orifice 21a increases, diaphragm 24 flexes upwardly, causing diaphragm button 27 to extend further through opening 26a. A second end of diaphragm button 27 may engage and push up on pivot arm 36. Calibration or adjustment of the pivot plate may also be accomplished by manipulation of adjusting screw 33.

Figure 8A:
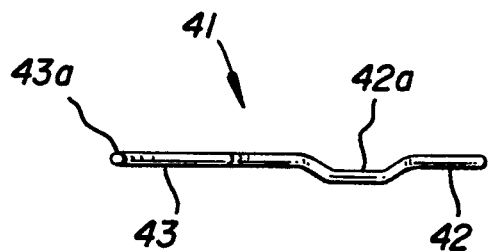
FIG. 8A shows a top plan view of a crankshaft according to a first embodiment of the invention.
Figure 8B:
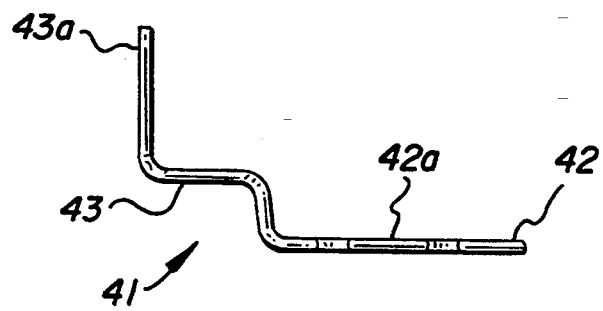
FIG. 8B shows a side view in elevation of the crankshaft as shown in FIG. 8A.

A crank arm or crankshaft may be pivotally supported by base plate 30 and pivot plate 35. As best shown in FIGS. 4, 8A and 8B, according to the preferred embodiment, the crankshaft 41 has a first portion 42 and a second portion 43. Preferably, the crankshaft is configured so the first portion lies in a first plane and the second portion lies in a second plane, wherein the first plane is perpendicular to the second plane. First portion 42 is pivotally supported by pivot supports 37 of pivot plate 35, and includes a cranked or offset segment 42a located between the pivot supports and in alignment with diaphragm button 27. The diaphragm button may extend upwardly through opening 26a and engage offset segment 42a, thus causing crankshaft 41 to pivot or rotate about an axis defined by first portion 42. As crankshaft 41 rotates, second portion 42 swings or moves laterally. To limit any axial movement of crankshaft 41, base plate 30 is provided on either side with stops 30a, 30b. Preferably, diaphragm button 27 contacts free end 36a of pivot arm 36. Free end 36a provides a contact surface for engagement with diaphragm button 27 than the crankshaft provides. It is also preferable to connect free end 36a to the diaphragm button 27 in any suitable manner, such as a pin connection. Such a connection minimizes the possibility of the diaphragm button being separated from the gauge.

Figure 6:
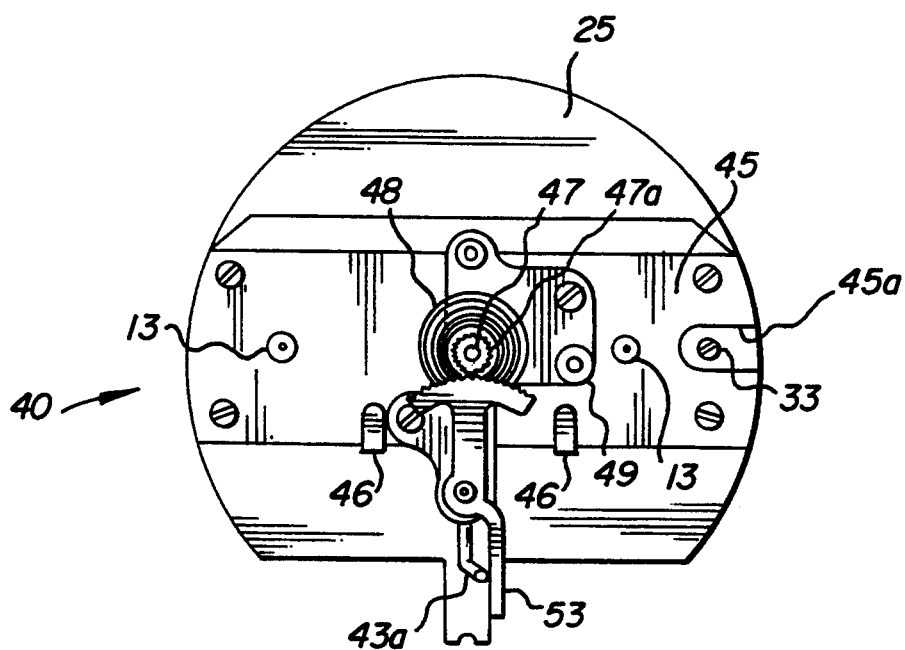
FIG. 6 shows a top plan view of the invention with the indicator dial removed for clarity.
Figure 7A:
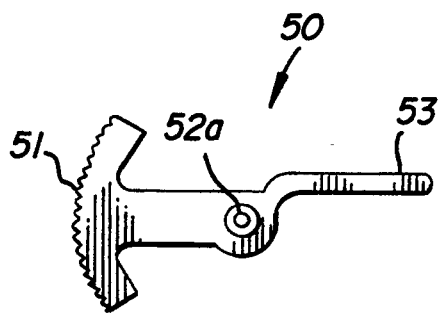
FIG. 7A shows a top plan view of the movement amplifying gear segment of the invention.
Figure 7B:
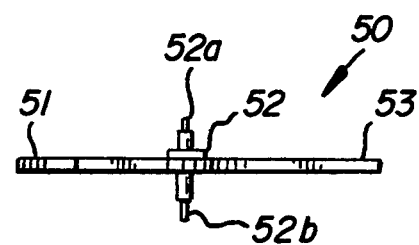
FIG. 7B shows a side view in elevation of the movement amplifying gear segment of FIG. 7A.

FIG. 6 illustrates a top plan view of motion amplifying gauge movement 40. The motion amplifying gauge movement includes a first pivotal gear segment 50, a support platform 45 and indicating pointer shaft 47. As best shown in FIGS. 7A and 7B, first pivotal gear segment 50 includes a sector gear 51, a pivot member 52 having pivot ends 52a, 52b, and an extension arm 53. Preferably, the gear segment is a planar gear segment, thus, the extension arm and the sector gear lie in the same plane. Gear segment 50 rotates about a first pivot connection between support platform 45 and pivot end 52b and about a second pivot connection between pivot end 52a and a cover member 55 (See FIG. 1).

Support platform 45 may also include platform stops 46 which limit the rotation of gear segment 50. Platform stops 46 may be bent or angled metal extensions of support platform 45 or any conventional fastener such as threaded fasteners or buttons. Gear segment 50 also includes gear teeth which engage pinion 47a located on indicating pointer shaft 47. A rotation biasing mechanism or spiral spring 48 is preferably connected along a first end to indicating pointer shaft 47 and along a second end to spiral spring connecting post 49. Spiral spring 48 biases gear segment 50 toward a first position contacting one of platform stops 46. Support platform 45 also includes a platform notch 45a which facilitates the use of an instrument such as a screwdriver, when actuating adjusting screw 33.

In operation, an increase in pressure is sensed by diaphragm 24 which flexes upwardly and moves diaphragm button 27 in an upward direction and into contact with free end 36a of pivot arm 36. As free end 36a moves upwardly, it contacts and engages cranked segment 42a of crankshaft 41. Rotation of first portion 42 causes lateral displacement of second portion 43. In conventional diaphragm gauges diaphragm button may move a distance in the range from about a few mils to about 0.020 inches. This limited or very short range of motion is typically sufficient to displace an indicating pointer from a range of about 0°s to about 60°s. According to the invention gear segment 50 and pinion 47 are advantageously configured to amplify the motion of diaphragm button 27 so indicator pointer 12 is displaced in the range from about 0° to about 270°. Thus, the invention provides a diaphragm-type pressure gauge having a much greater angular displacement than found in similar conventional gauges. As free end 43a of crankshaft 41 is laterally displaced, it contacts and moves extension arm 53 of gear segment 50.

Figure 9A:
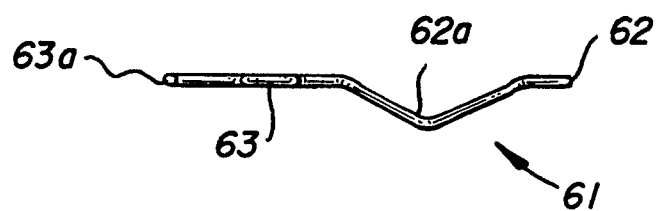
FIG. 9A shows a top plan view of a second embodiment of the crankshaft according to the invention.
Figure 9B:
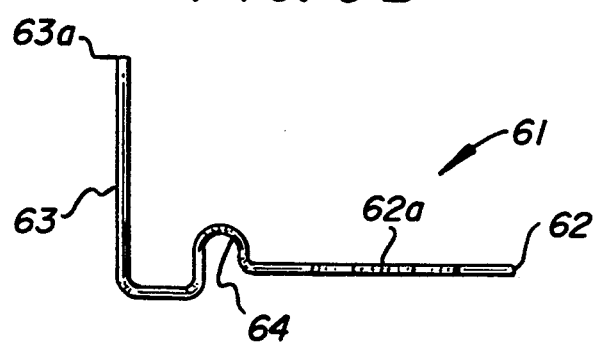
FIG. 9B shows a side view in elevation of the crankshaft as shown in FIG. 9A.

FIGS. 9A and 9B show a second embodiment of the crankshaft according to the invention. Crankshaft 61 also has a first portion 62 and a second portion 63. First portion 62 includes a cranked or offset segment 62a which may be contacted by free end 36a of pivot arm 36 in response to movement of diaphragm button 27. As first portion 62 rotates, second portion 63 moves laterally, bringing free end 63a into contact with extension arm 53 of gear segment 50. Thus, second crankshaft 61 functions substantially identically to first crankshaft 41. Second crankshaft 61, however, includes U-shaped portion 64 which corresponds in shape to and is located about one of stops 30a, 30b located on base plate 30.

Figure 10:
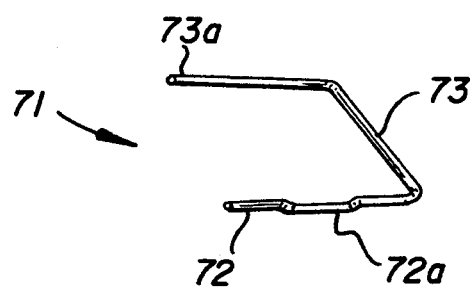
FIG. 10 shows a side view in elevation of a third embodiment of the crankshaft according to the invention.

FIG. 10 shows another embodiment of the crankshaft according to the invention. Third crankshaft 71 has a first portion 72 and a second portion 73. First portion 72 includes a cranked or offset segment 72a which rotates in response to motion by diaphragm button 27. Second portion 73 includes a free end 73a.

Figure 11:
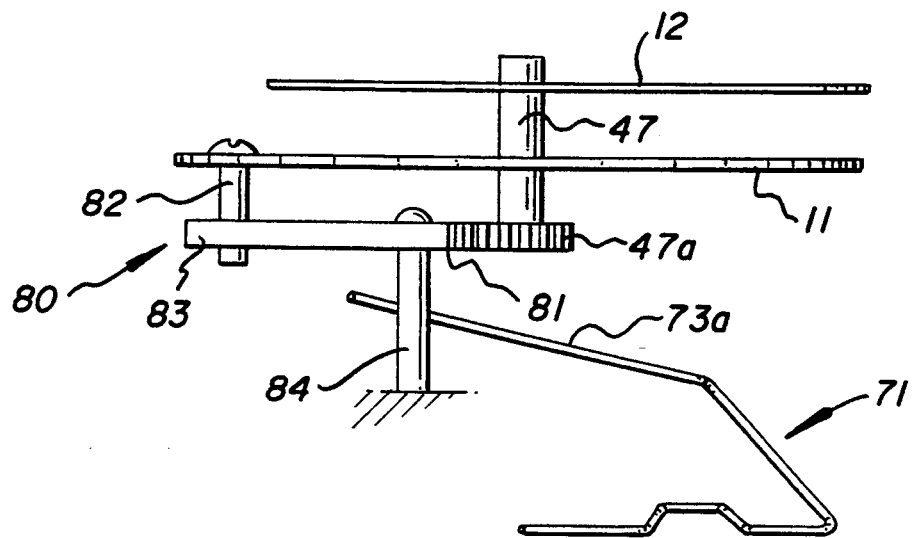
FIG. 11 shows a side view in elevation of another embodiment of an indicator gauge according to the invention.
Figure 12:
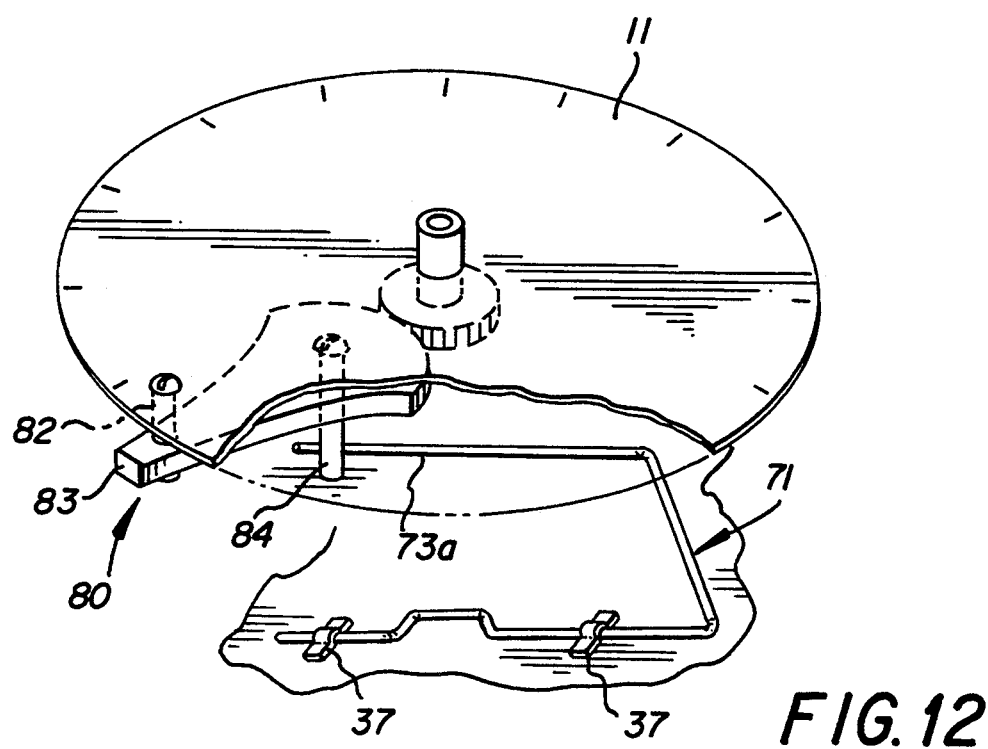
FIG. 12 shows a perspective view of the indicator gauge of FIG. 11.

FIGS. 11 and 12 show a second embodiment of an indicator gauge with a motion amplifying mechanism. In response to changes in pressure, free end 73a of crankshaft 71 moves laterally and engages projecting boss or pinion driver pin 84 of second pivotal gear segment 80. Preferably, pivot member 82 of second pivotal gear segment 80 is movably connected to indicator dial 11. As gear segment 80 moves about pivot member 82, the gear teeth of sector gear 81 engage and move pinion 47a.

Figure 13:
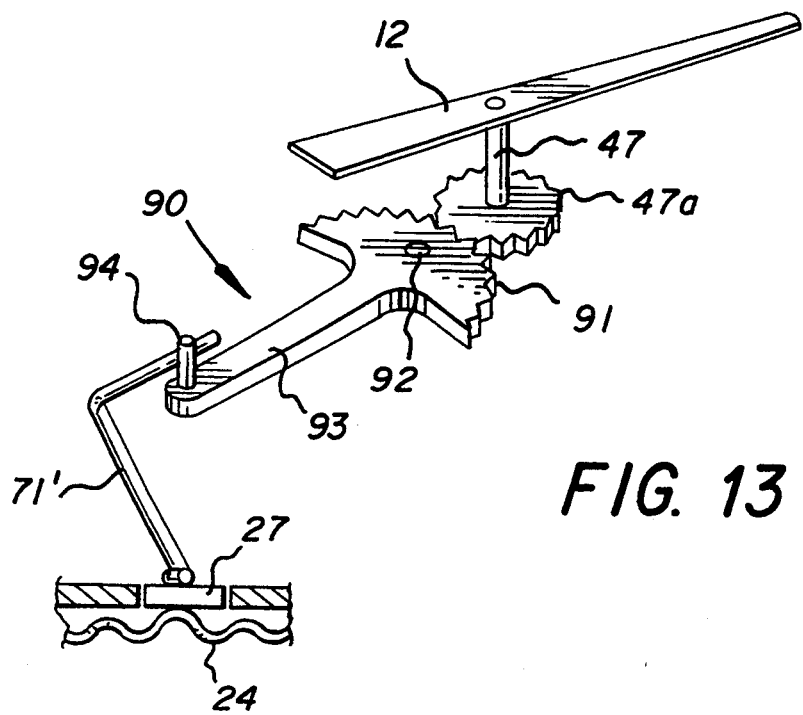
FIG. 13 shows a perspective view of another embodiment of an indicator gauge according to the invention.
Figure 14:
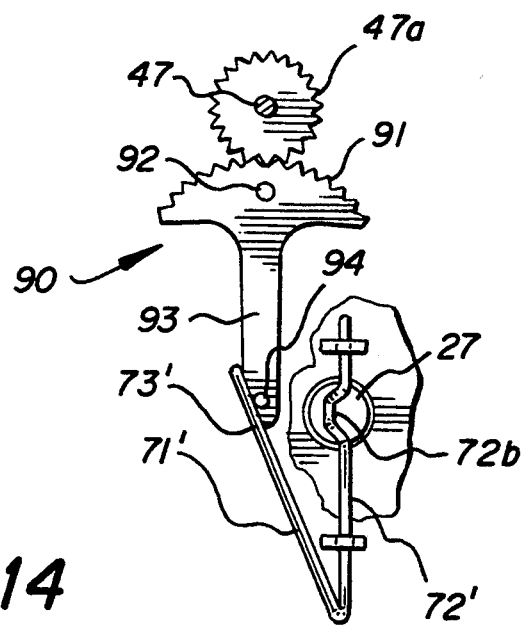
FIG. 14 shows a top plan view of the indicator gauge of FIG. 13.

FIGS. 13 and 14 show a third embodiment of an indicator gauge according to the invention. Crankshaft 71' is a slight variation on the third crankshaft. Crankshaft 71' has a first portion 72' with a cranked or offset segment 72b. When facing in the direction from the connection between second portion 73' and first portion 72' to the distal end of first portion 72', the cranked or offset segment is located on the left side of first portion 72'. In contrast, third crankshaft 71 has cranked or offset segment 72a located on the right side, when facing in the same direction. Of course, it is to be understood that the terms "left side" and "right side" are used for illustrative purposes only, and are not to be construed as a positive limitation on the invention. As shown in FIG. 14, second portion 73' is preferably laterally offset from the axis of first portion 72'. In response to the movement of diaphragm button 27, offset second portion 73' moves laterally and contacts upwardly projecting boss or pinion driver 94 of third pivotal gear segment 90. As third pivotal gear segment 90 pivots or rotates about pivot member 92, the gear teeth of sector gear 91 engage and actuate pinion 47a to rotate indicating pointer shaft 47 and indicating pointer 12.

The illustrated embodiments are shown by way of example. The spirit and scope of the invention is not to be restricted by the preferred embodiment shown.

What is claimed is:

1. An indicator gauge comprising:
   a gauge movement responsive to a sensed condition including at least:
      a pivotal indicating pointer shaft,
      a pinion gear fixedly mounted on said pointer shaft,
      a pivotal gear segment engaging said pinion gear, and
      a crankshaft configured to engage and move said pivotal gear segment in response to the sensed condition;
   a condition sensing assembly abutting said gauge movement;
   means for calibrating or adjusting the indicator gauge comprising at least:
      a base plate having a first end and a second end, said first end being fixedly attached to said condition sensing assembly and said second end configured so as to be adjustable toward or away from said condition sensing assembly, a pivot plate pivotally mounted on said base plate, and an adjusting screw provided in said second end of base plate for calibrating or adjusting said pivot plate; and
      an indicating pointer connected to said pivotal indicating pointer shaft.

2. An indicator gauge according to claim 1, wherein said gauge movement further comprises:
   a rotational bias mechanism connected to said pivotal indicating pointer shaft.

3. An indicator gauge according to claim 2, wherein said rotational bias mechanism is a spiral spring.

4. An indicator gauge according to claim 1, wherein said gauge movement further comprises:
   a gear segment stop mechanism located in a plane of motion of said pivotal gear segment.

5. An indicator gauge according to claim 4, wherein said gear segment stop mechanism is located away from said pivotal gear segment.

6. An indicator gauge according to claim 1, wherein said pivotal gear segment exhibits at least a sector gear, a pivot member and an extension arm.

7. An indicator gauge according to claim 6, wherein said sector gear of said pivotal gear segment is a planar sector gear.

8. An indicator gauge according to claim 6, wherein said sector gear and said extension arm are configured to lie in the same plane.

9. An indicator gauge according to claim 1, wherein said crankshaft exhibits at least a first portion having a cranked element and a second portion having a free end.

10. An indicator gauge according to claim 9, wherein said crankshaft is configured so said first portion lies in a first plane, said second portion lies in a second plane, and said first plane is perpendicular to said second plane.

11. An indicator gauge according to claim 9, wherein said crankshaft is configured so said second portion engages and moves said pivotal gear segment in response to the sensed condition.

12. An indicator gauge according to claim 9, wherein said pivotal gear segment exhibits at least a sector gear and an extension arm and said crankshaft is configured so said second portion engages and moves said extension arm in response to the sensed condition.

13. An indicator gauge according to claim 1, wherein said pivotal gear segment exhibits at least a sector gear engaging said pinion gear, a pivot member pivotally connected to an indicator dial and a downwardly extending boss engaging said crankshaft.

14. An indicator gauge according to claim 1, wherein said pivotal gear segment is a wedge-shaped gear segment.

15. An indicator gauge according to claim 1, wherein said pivotal gear segment exhibits at least a sector gear engaging said pinion gear, a pivot member pivotally connected to an indicator dial, an extension arm and an upwardly extending boss engaging said crankshaft.

16. An indicator gauge according to claim 1, wherein said first end of said base plate exhibits a triangular shape.

17. An indicator gauge according to claim 1, wherein said pivot plate exhibits:
   a pivot arm having a free end configured to transfer motion from said condition sensing assembly to said cranked element of said crankshaft;
   pivot supports for pivotally supporting said first potion of said crankshaft.

18. An indicator gauge comprising:
   a limited motion element responsive to a sensed condition;
   a motion amplifying gauge movement connected to and responsive to said limited motion element;
   a condition sensing assembly abutting said limited motion element;

means for calibrating or adjusting the indicator gauge comprising at least;
  a base plate having a first end and a second end, said first end being fixedly attached to said condition sensing assembly and said second end configured so as to be adjustable toward or away from said condition sensing assembly;
  a pivot plate pivotally mounted on said base plate; and an adjusting screw provided in said second end of said base plate for calibrating or adjusting said pivot plate; and
an indicating pointer mounted on said motion amplifying gauge movement; said motion amplifying gauge movement including at least;
  a pivotal indicating pointer shaft, and
  motion amplifying means for amplifying a motion of said limited
  motion element, said motion amplifying means including a crankshaft.

19. An indicator gauge according to claim 18, wherein said motion amplifying means further comprises a pivotal gear segment.

20. An indicator gauge according to claim 19, wherein said pivotal gear segment exhibits at least a sector gear, a pivot member and an extension arm.

21. An indicator gauge according to claim 20, wherein said sector gear of said pivotal gear segment is a planar sector gear.

22. An indicator gauge according to claim 20, wherein said sector gear and said extension arm are configured to lie in the same plane.

23. An indicator gauge according to claim 18, wherein said crankshaft exhibits at least a first portion having a cranked element and a second portion having a free end.

24. An indicator gauge according to claim 23, wherein said crankshaft is configured so said second portion engages and moves said pivotal gear segment in response to the sensed condition.

25. An indicator gauge according to claim 23, wherein said pivotal gear segment exhibits at least a sector gear and an extension arm and said crankshaft is configured so said second portion engages and moves said extension arm in response to the sensed condition.

26. An indicator gauge comprising:
  a diaphragm-type gauge sensor including a deformable diaphragm;
  an axially displaceable pin abutting said diaphragm;
  means for translating axial motion of said pin to rotational motion and exhibiting a crankshaft;
  means for amplifying said rotational motion and responsive to said means for translating;
  means for calibrating or adjusting the indicator gauge comprising at least:
    a base plate having a first end and a second end, said first end being fixedly attached to said diaphragm-type gauge sensor and said second end configured so as to be adjustable toward or away from said diaphragm-type gauge sensor; a pivot plate pivotally mounted on said base plate; and
    an adjusting screw provided in said second end of said base plate for calibrating or adjusting said pivot plate; and
  an indicating pointer connected to said means for amplifying.

* * * * *